(12) United States Patent
Katoh et al.

(10) Patent No.: US 7,010,992 B2
(45) Date of Patent: *Mar. 14, 2006

(54) STARTER HAVING ROTATION RESTRICTING STRUCTURE

(75) Inventors: Masahiro Katoh, Chiryu (JP); Kazuo Hirama, Obu (JP); Hiroshi Kaneda, Kariya (JP)

(73) Assignee: Denso Corporation, Kariya (JP)

( * ) Notice: Subject to any disclaimer, the term of this patent is extended or adjusted under 35 U.S.C. 154(b) by 60 days.

This patent is subject to a terminal disclaimer.

(21) Appl. No.: 10/793,846

(22) Filed: Mar. 8, 2004

(65) Prior Publication Data

US 2004/0180750 A1 Sep. 16, 2004

(30) Foreign Application Priority Data

Mar. 13, 2003 (JP) .............................. 2003-068251

(51) Int. Cl.
*F16H 57/08* (2006.01)
(52) U.S. Cl. ........................................ 74/7 E; 475/347
(58) Field of Classification Search ................ 475/347; 74/7 E See application file for complete search history.

(56) References Cited

U.S. PATENT DOCUMENTS

| 4,503,719 | A | * | 3/1985 | Hamano | ........................ 74/7 E |
| 6,131,477 | A | * | 10/2000 | Gaydek et al. | ................ 74/411 |
| 2002/0135186 | A1 | * | 9/2002 | Olivier | ......................... 290/38 |
| 2003/0200826 | A1 | | 10/2003 | Oomura et al. | |

FOREIGN PATENT DOCUMENTS

| JP | 62 247175 A | * 10/1987 |
| JP | A 63-277859 | 11/1988 |

* cited by examiner

*Primary Examiner*—Dirk Wright
(74) *Attorney, Agent, or Firm*—Oliff & Berridge, PLC

(57) ABSTRACT

A center case has a force-receiving wall and a fixed wall, and is rigidly fixed in a starter. A gear-forming section is coaxially arranged with the center case, and has a forcing wall and a movable wall on the side of the center case. A cushion member is elastically received between the force-receiving wall of the center case and the forcing wall of the gear-forming section. The fixed wall of the center case and the movable wall of the gear-forming section are arranged to have a gap, and oppose each other. When an excessive torque works on the gear-forming section via an internal gear, the cushion member absorbs an impact force to move the movable wall by a predetermined distance. In this case, the movable wall contacts the fixed wall so that a compression rate of the cushion member can be restricted.

11 Claims, 5 Drawing Sheets

BEFORE ROTATION

AFTER ROTATION

STARTER HAVING ROTATION RESTRICTING STRUCTURE

CROSS REFERENCE TO RELATED APPLICATION

This application is based on Japanese Patent Application No. 2003-68251 filed on Mar. 13, 2003, the disclosure of which is incorporated herein by reference.

BACKGROUND OF THE INVENTION

1. Field of the Invention

The present invention is related to a starter having an epicycle reduction gear (planetary gear reduction device) for reducing rotation speed of a motor.

2. Description of Related Art

In a conventional starter described in JP-A-63-277859, an epicycle reduction gear is provided between a motor and a power shaft. An internal gear is used in the epicycle reduction gear. An outer peripheral section of the internal gear is rotatably provided along with an inner peripheral surface of a housing. A closed space is formed between a recess section formed in the outer peripheral section of the internal gear and a recess section formed in an inner peripheral section of the housing. An elastic block is provided in the closed space, so that rotation of the internal gear is restricted with respect to the housing via the elastic block. The elastic block is compressed and deformed when excessive torque works on the internal gear, so as to absorb impact force.

However, the closed space needs to be secured for providing the elastic block (cushion member) between the internal gear and the housing, in the above starter. Accordingly, the outer diameter of the housing is apt to be large, and the epicycle reduction gear becomes large.

Besides, a large cushion member cannot be used in this structure, because the cushion member is provided in the limited closed space. The cushion member has an area for receiving force when excessive torque works on the internal gear. However, in this case, the area of the cushion member is limited, and this structure cannot be used in a high-power starter.

Furthermore, this structure does not limit a compression degree of the cushion member. Here, as the torque applied to the internal gear increases, the compression degree of the cushion member becomes large. If the cushion member is repeatedly used in a large compression rate (e.g., over 30%), fatigue arises in the cushion member at an early state, and life of the cushion member shortened. As a result, the cushion member may be broken or damaged after a short period, and an impact-absorption capacity of the cushion member decreases.

SUMMARY OF THE INVENTION

In view of the foregoing problems, it is an object of the present invention to provide a starter in which a force receiving area of a cushion member can be secured and a compression rate of the cushion member is restricted, without upsizing an epicycle reduction gear.

According to the present invention, a starter for transmitting a rotation force to an internal combustion engine includes a motor that generates the rotation force, and an epicycle reduction gear that reduces a rotation speed of the motor and transmits the rotation speed to the internal combustion engine. Further, the epicycle reduction gear includes a sun gear that is rotated by the motor, an internal gear that is coaxially arranged with the sun gear, a rotation-restricting unit that includes a cushion member made of an elastic material and restricts rotation of the internal gear via the cushion member, and a planetary gear that engages with the sun gear and the internal gear. In the starter, when an excessive torque larger than a predetermined torque works on the internal gear, the cushion member is elastically compressed to permit a rotation of the internal gear. In addition, the rotation-restricting unit further includes a stopper which restricts a rotating degree of the internal gear within a predetermined range when the excessive torque works on the internal gear.

In this structure, the rotating degree of the internal gear is restricted within the predetermined range by the rotation-restricting unit, when excessive torque works on the internal gear. Therefore, a compression rate of the cushion member can be restricted in a predetermined range, and the cushion member is not entirely compressed. As a result, the cushion member can be prevented from breakage, damage and fatigue at an early state, so that the starter including the cushion member can be used for a long time.

Preferably, the rotation-restricting unit further includes a fixed member that is fixed to be disable to circumferentially rotate, and a cylindrical member that is circumferentially rotatable by a predetermined degree with respect to the fixed member. Further, the fixed member is constructed with a force-receiving wall located circumferentially in a predetermined area and the stopper located on a radial outer side with respect to the force-receiving wall. In addition, the cylindrical member includes the internal gear on one axially end side, a forcing wall arranged on the other axially end side with respect to the internal gear, and a movable wall arranged in a radial outer side with respect to the forcing wall. In this case, the movable wall is provided to be separated from the stopper by a predetermined circumferential distance, the cushion member is received between the force-receiving wall and the forcing wall while being compressed by a predetermined amount, and the movable wall contacts the stopper so as to restrict the compression rate of the cushion member when the cylindrical member rotates by the predetermined degree with respect to the fixed member. Therefore, the compression rate of the cushion member can be readily accurately controlled. For example, the compression rate of the cushion member is set in a range between 10% and 30%.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
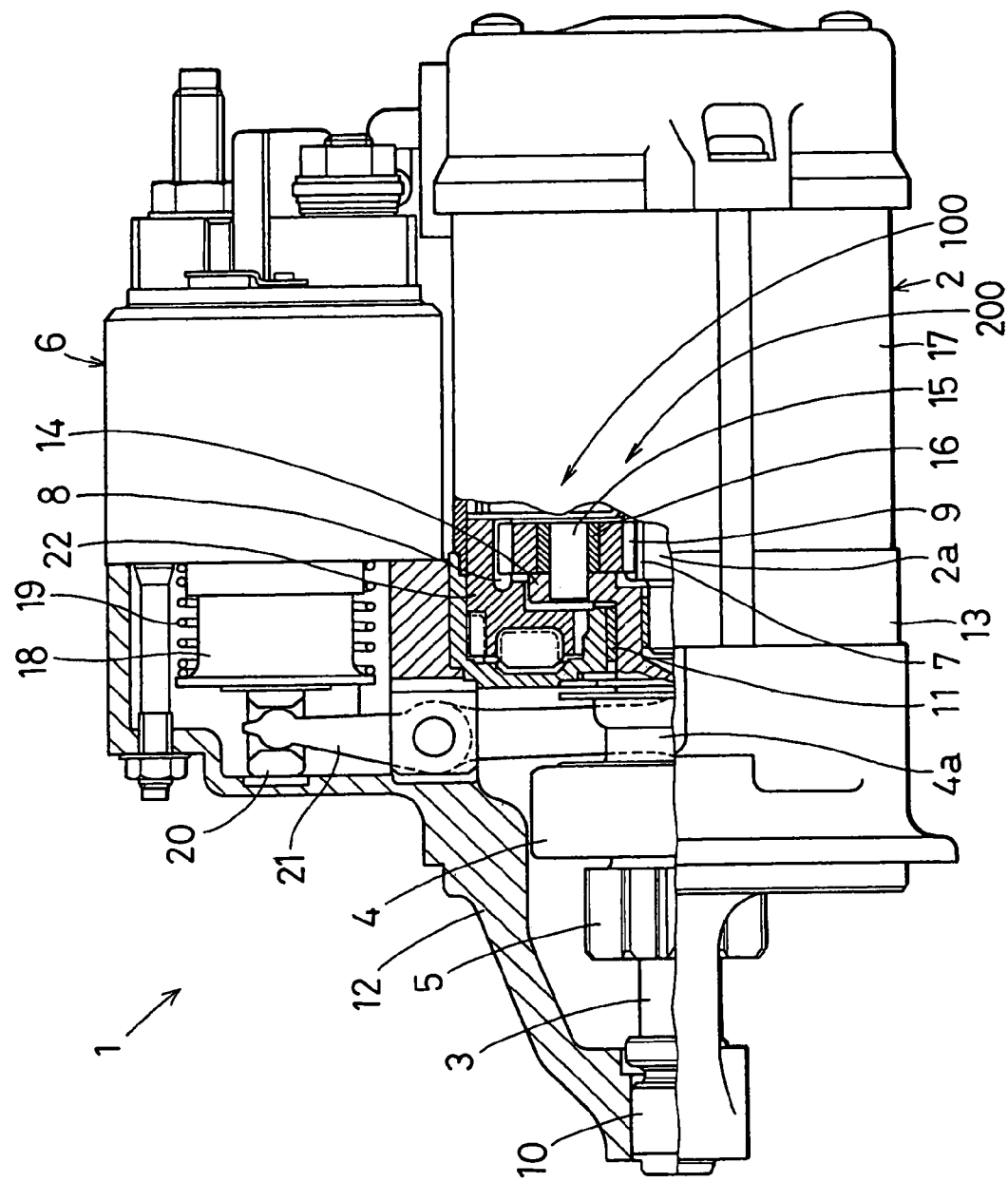
FIG. 1 is a partially cross-sectional view showing a starter according to an embodiment of the present invention.

As shown in FIG. 1, a starter 1 is constructed with a motor 2, an epicycle reduction gear 100 (planetary gear reduction device), a power shaft 3, a one-way clutch 4, a pinion gear 5, an electromagnetic switch (solenoid switch) 6, and the like. The motor 2 generates rotating power. The epicycle reduction gear 100 reduces rotation speed of the motor 2. The power shaft 3 receives torque output by the epicycle reduction gear 100, and rotates. The pinion gear 5 and the one-way clutch 4 are provided on the power shaft 3. The solenoid switch 6 turns ON/OFF the motor 2.

The motor 2 is a generally known dc motor. When an electric contact (not shown) provided in the solenoid switch 6 is closed, an armature received in the motor 2 is energized by an in-vehicle battery, so that rotating power is generated in the armature. The epicycle reduction gear 100 is constructed with a sun gear 7, an internal gear 8, a rotation-restricting unit 200, and multiple planetary gears 9. The sun gear 7 is formed on the rotating shaft 2a of the motor 2. The internal gear 8 is coaxially arranged with respect to the sun gear 7. The rotation-restricting unit 200 restricts rotation of the internal gear 8. The multiple planetary gears 9 engage with the sun gear 7 and the internal gear 8.

The power shaft 3 is coaxially arranged with respect to the rotating shaft 2a of the motor 2. The power shaft 3 is rotatably supported by a front housing 12 and a center case 13 via a pair of bearings 10, 11. A carrier 14 is integrally provided on the end section of the power shaft 3 (right side in FIG. 1). The planetary gears 9 rotate around the sun gear 7, and perform a revolution motion. The revolution motion of the planetary gears 9 is transferred to a carrier 14, so that the carrier 14 is rotated. Gear shafts 15 are press-inserted into the carrier 14. The planetary gear 9 is rotatably supported on the gear shaft 15 via a bearing 16. The center case 13 constructs a fixed member. The center case 13 is inserted between the front housing 12 and a motor yoke 17 to be fixed, so that the center case 13 cannot rotate.

The one-way clutch 4 is a generally known roller-type clutch, in which power is transmitted from its outer section to its inner section via a roller (not shown). A spline tube 4a is integrally provided with the outer section of the one-way clutch 4. A female spline (not shown) is formed inside of the spline tube 4a. A male spline (not shown) is formed on the power shaft 3. The female spline engages with the male spline, so that the spline tube 4a can move on the power shaft 3.

The pinion gear 5 is integrally provided with the inner section of the one-way clutch 4. The pinion gear 5 can be displaced with the one-way clutch 4 in the left direction in FIG. 1, when an engine is started. The pinion gear 5 engages with a ring gear (not shown) of the engine, so that rotation power of the motor 2 is transmitted to the engine.

The solenoid switch 6 is constructed with a coil (not shown), a plunger 18, and the like. When a starting switch (not shown) is turned ON so that the coil is energized, the plunger 18 can axially move in the coil. That is, the coil is energized, magnetic power is generated and the plunger is moved by the magnetic power. The plunger 18 is moved in the right direction in FIG. 1, while compressing a spring 19. A shift lever 21 is connected with the plunger 18 via a hook 20. The plunger 18 is displaced, so that the shift lever 21 is operated to displace the one-way clutch 4 and the pinion gear 5 in the opposite direction with respect to the motor 2. Thus, the electric contact is closed and the armature provided in the motor 2 is energized.

Figure 2A:
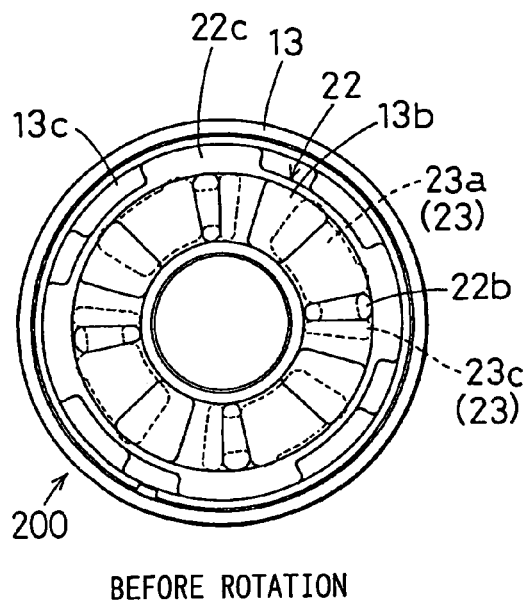
FIG. 2A is a front view showing a construction of a center case and a gear-forming member before a rotation.
Figure 2B:
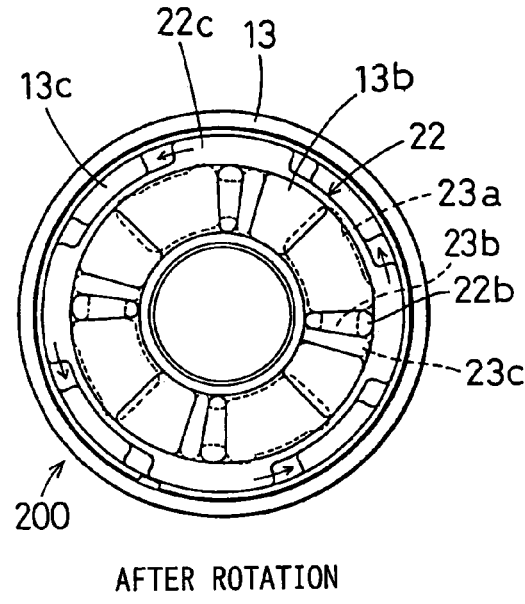
FIG. 2B is a front view showing the construction of the center case and the gear-forming member after the rotation.
Figure 2C:
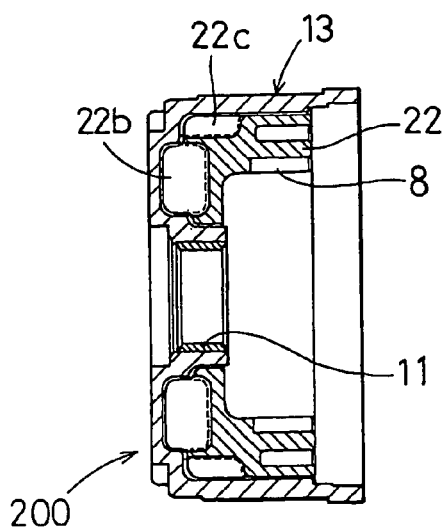
FIG. 2C is a cross-sectional view showing the construction of the center case and the gear-forming member.
Figure 3A:
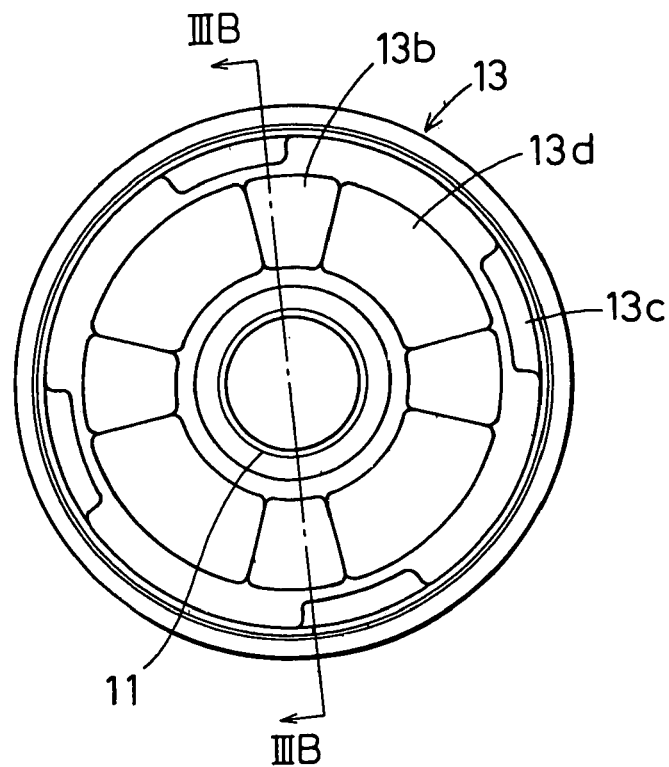
FIG. 3A is a front view showing the center case.

Next, a structure of the rotation-restricting unit 200 is described in detail. As shown in FIGS. 2A–2C, the rotation-restricting unit 200 is constructed with the center case 13, a gear-forming member 22 (cylindrical member), cushion members 23, and the like. The gear-forming member 22 is built in the center case 13. The cushion members 23 are inserted between the center case 13 and the gear-forming member 22. The center case 13 is made of aluminum alloy and formed by die-casting, for example. As shown in FIG. 3A, the center case 13 is formed in a cylindrical shape having a circular shaped bottom face (case end 13a). A force-receiving wall 13b and a fixed wall 13c are integrally formed inside of the center case 13.

Figure 3B:
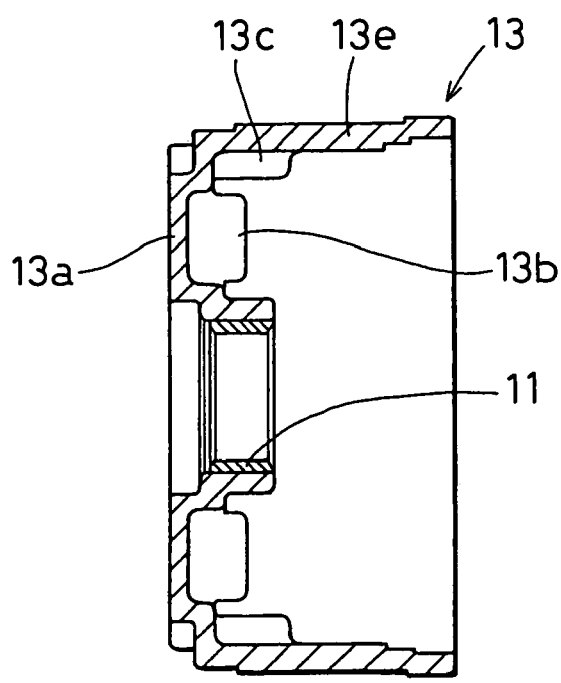
FIG. 3B is a cross-sectional view taken along the line IIIB—IIIB in FIG. 3A.

The force-receiving wall 13b protrudes from the case end 13a in an axial direction (right side in FIG. 3B). The force-receiving walls 13b are circumferentially provided at four sections at the same interval. As shown in FIG. 3A, each recessed container section 13d is formed in a section between circumferentially adjacent two of the force-receiving walls 13b, for receiving the cushions 23.

The fixed walls 13c are arranged on the outer periphery side with respect to the force-receiving walls 13b, so as to protrude from the outer-cylindrical section 13e of the center case 13 to the radially inner side. The fixed walls 13c are circumferentially provided at four sections at the same interval.

The gear-forming member 22 is made of thermoplastic, and formed by injection molding or the like. As shown in FIGS. 4B and 4C, the gear-forming member 22 is formed in a cylindrical shape having a circular-shaped bottom face (circular bottom face) 22a. The internal gear 8 is formed in the internal periphery of the gear-forming member 22, which is located on the axially opposite side end with respect to the circular bottom face 22a.

Forcing walls 22b and movable walls 22c are provided on the gear-forming member 22. Each forcing wall 22b respectively opposes to each force-receiving wall 13b of the center case 13. Each movable wall 22c respectively opposes to each fixed walls 13c of the center case 13. The forcing walls 22b axially protrudes from the circular bottom face 22a to an opposite side of the internal gear 8. The forcing walls 22b are circumferentially formed at the same interval.

Figure 4A:
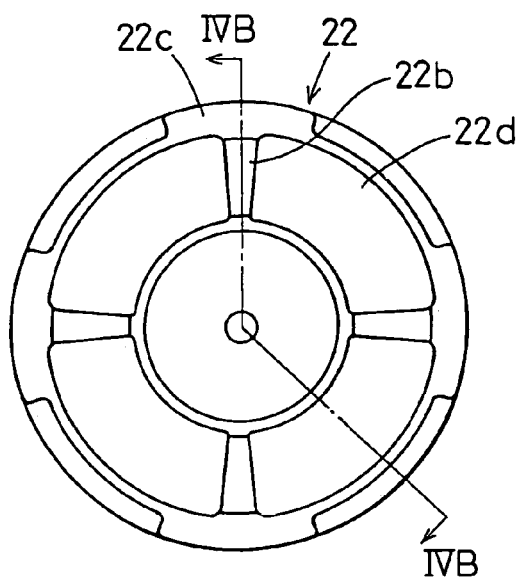
FIG. 4A is a front view showing the gear-forming member.
Figure 4B:
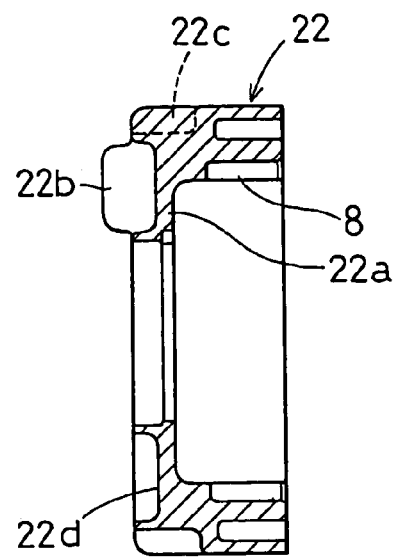
FIG. 4B is a cross-sectional view taken along the line IVB—IVB in FIG. 4A.
Figure 4C:
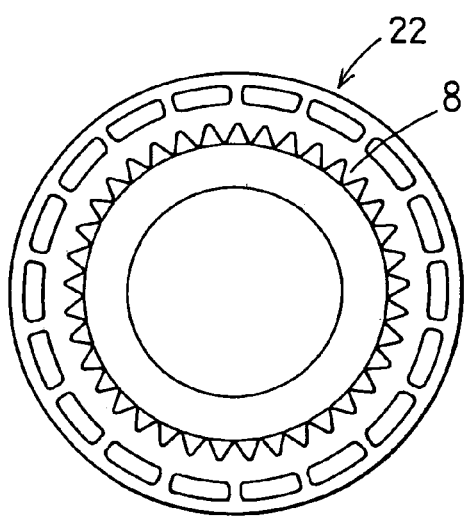
FIG. 4C is a rear view showing the gear-forming member when being viewed from the side of an internal gear.

As shown in FIG. 4A, each recessed container section 22d is formed in a section between circumferentially adjacent two of the forcing walls 22b for receiving the cushion 23 respectively.

The movable walls 22c are arranged on the outer periphery side with respect to the forcing walls 22b, so that the movable walls 22c protrude in the radially outer direction. The movable walls 22c are arranged on the axially opposite end side with respect to the inner gear 8. The movable walls 22c are circumferentially provided at four sections at the same interval. The outer diameter of the movable walls 22c (i.e., distance between outer peripheral surfaces of the movable walls 22c opposed each other) is same as the outer diameter of the gear-forming member 22 on an axially end side in which the internal gear 8 is formed. The outer diameter of the movable walls 22c is predetermined, so that the outer peripheral surface of the movable walls 22c can slide along with an inner peripheral surface of the center case 13 (i.e., outer-cylindrical section 13e).

Figure 5A:
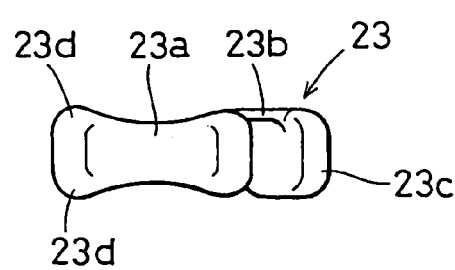
FIG. 5A is a front view showing a cushion member when being viewed from its outer periphery side.
Figure 5B:
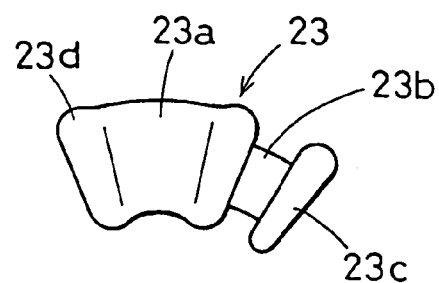
FIG. 5B is a side view showing the cushion member.

As shown in FIGS. 5A and 5B, each cushion member 23 has a main-elastic section 23a and a sub-elastic section 23c connected with the main-elastic section 23a via a band-shaped bridging section 23b. The main-elastic section 23a is formed approximately in a sector-shaped block in which a substantially circumferentially middle section is pinched. The entire cushion member 23 is integrally formed with an oil-proof rubber such as NBR. The cushion member 23 is made of the oil-proof rubber, so that the cushion member 23 does not deteriorate even if grease adheres to the cushion member 23. Accordingly, the oil-proof rubber is suitable for the cushion member 23 to keep the elastic characteristic of the cushion member 23 for a long period.

Hemispherically protruding sections 23d are formed on the outer peripheral side end of the main-elastic section 23a. The protruding sections 23d are formed on two ends of the main-elastic section 23a in an axial direction (thickness direction). The peripheral length of the sub-elastic section 23c is smaller than the peripheral length of the main-elastic section 23a. Specifically, the peripheral length of the sub-elastic section 23c is predetermined to be ⅕ of the peripheral length of the main-elastic section 23a, for example.

As shown in FIG. 2B, each forcing wall 22b of the gear-forming member 22 is press-inserted into a section between the main-elastic section 23a and the sub-elastic section 23c, so that the cushion member 23 is attached into the gear-forming member 22. The cushion member 23 built in the gear-forming member 22 is further received in the recessed container section 13d (FIG. 3A) of the center case 13.

The cushion member 23 is compressed by a predetermined compression rate in advance, and elastically received in a section between adjacent force-receiving walls 13b. In this condition, the main-elastic section 23a is elastically received between the forcing wall 22b and corresponding force-receiving wall 13b. Here, the forcing wall 22b is press-inserted into a section between the sub-elastic section 23c and the main-elastic section 23a. The sub-elastic section 23c is elastically received between the forcing wall 22b and corresponding force-receiving wall 13b. Thus, rotation of the gear-forming member 22 is restricted with respect to the center case 13 via the cushion member 23.

Therefore, the sub-elastic section 23c is compressed and deformed when the internal gear 8 rotates in its counter-rotating direction, so that the internal gear 8 can be prevented from counter rotating.

As shown in FIG. 2B, a predetermined gap is secured between the fixed wall 13c of the center case 13 and corresponding movable wall 22c of the gear-forming member 22, when the cushion member 23 is built in the center case 13 and the gear-forming member 22. The gear-forming member 22 can rotate with respect to the center case 13 by the length of the predetermined gap when the center case 13 and the gear-forming member 22 are constructed. Therefore, the gear-forming member 22 can rotate with respect to the center case 13 until the movable wall 22c contacts the fixed wall 13c while compressing and deforming the cushion member 23 (i.e., main-elastic section 23a).

The gap between the fixed wall 13c and the movable wall 22c are set, so that the maximum compression rate of the cushion member 23 (i.e., main-elastic section 23a) is set within 10–30%. Here, the maximum compression rate is a compression rate of the cushion member 23, when the movable wall 22c contacts the fixed wall 13c.

In this structure, a rotating degree (i.e., compression degree of the cushion member 23) of the internal gear 8 is restricted within a predetermined range by the fixed wall 13c, when excessive torque works on the internal gear 8. Therefore, the cushion member 23 is not entirely compressed, and the cushion member 23 can be used within the predetermined compression rate (i.e., 10–30%). As a result, the cushion member can be prevented from being breakage, damage and fatigue at an early state.

Next, operation of the starter is described in detail. When a starter switch is turned ON, and the coil of the solenoid switch 6 is energized, the plunger 18 is moved in the right direction in FIG. 1. The one-way clutch 4 and the pinion gear 5 are displaced by the plunger 18 via the shift lever 21 in the forward direction (left direction in FIG. 1) along with the power shaft 3. The side face of the pinion gear 5 contacts the side face of the ring gear of the engine, and the displacement of the pinion gear 5 is stopped. The electric contact is closed by the displacement of the plunger 18, so that the armature received in the motor 2 is energized and rotated. The rotation speed of the armature is reduced by the epicycle reduction gear 100, and the rotation is transmitted to the power shaft 3. The rotation transmitted to the power shaft 3 is transmitted to the pinion gear 5 via the one-way clutch 4. The pinion gear 5 is rotated to a position in which the pinion gear 5 can engage with the ring gear of the engine, so that the pinion gear 5 engages with the ring gear. Rotation power is transmitted from the pinion gear 5 to the ring gear, so that cranking of the engine is performed.

The coil is de-energized and the solenoid power (drawing power) is eliminated, when the starting switch is turned OFF after the engine is started. In this situation, the plunger 18 is displaced to an initial position by the reactive force of the spring 19. The electric contact is opened by the displacement of the plunger 18, and electric supply to the armature is terminated. Subsequently, the one-way clutch 4 and the pinion gear 5 fall back along with the power shaft 3 via the shift lever 21, and stops.

Next, an operation of the rotation-restricting unit 200 is described in detail. The gear-forming member 22 receives reactive force from the internal gear 8 in the direction shown by arrow in FIG. 6A, when an operation of the starter 1 is started. The forcing wall 22b of the gear-forming member 22 presses the main-elastic section 23a of the cushion member 23 in the lower direction in FIG. 6A by the reactive force.

Each main-elastic section 23a of the cushion member 23 is elastically received in the section between each forcing wall 22b of the gear-forming member 22 and each force-receiving wall 13b of the center case 13 from an initial state. Here, the initial state is a state before starting the operation of the starter 1. In this situation, the reactive force working on the gear-forming section 22 is absorbed by the main-elastic section 23a via the forcing wall 22b.

The compression rate of the main-elastic section 23a becomes approximately the maximum rate (e.g., 30%), when large reactive force works on the gear-forming member 22 from the internal gear 8. In this situation, as shown in FIG. 6B, each movable wall 22c of the gear-forming member 22 respectively contact each fixed wall 13c of the center case 13, so that rotation of the gear-forming member 22 is restricted. Thus, the compression rate of the main-elastic section 23a is restricted.

Figure 6A:
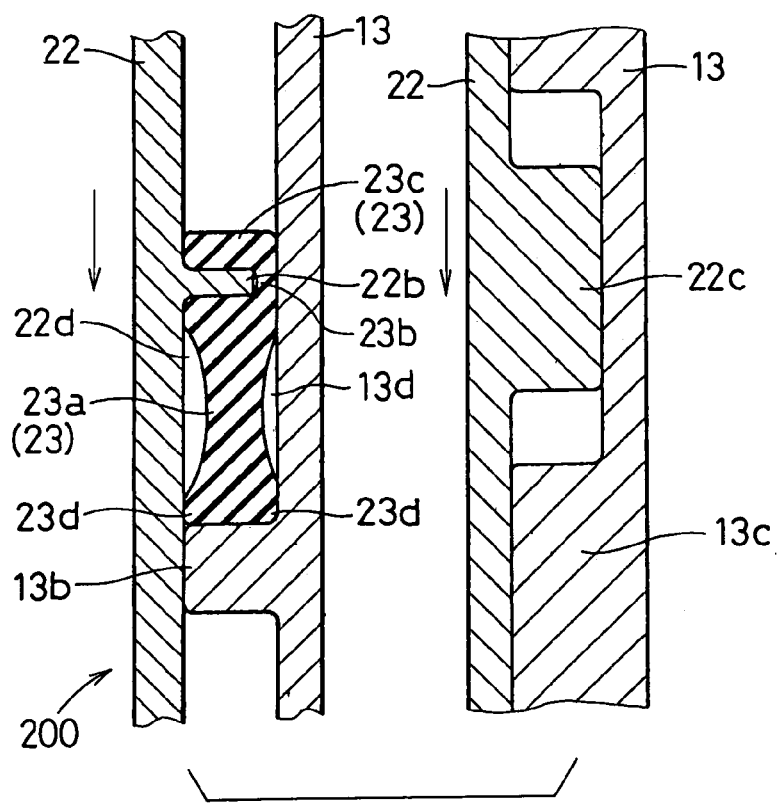
FIGS. 6A and 6B are schematic sectional views showing a structure of a rotation-restricting unit.
Figure 6B:
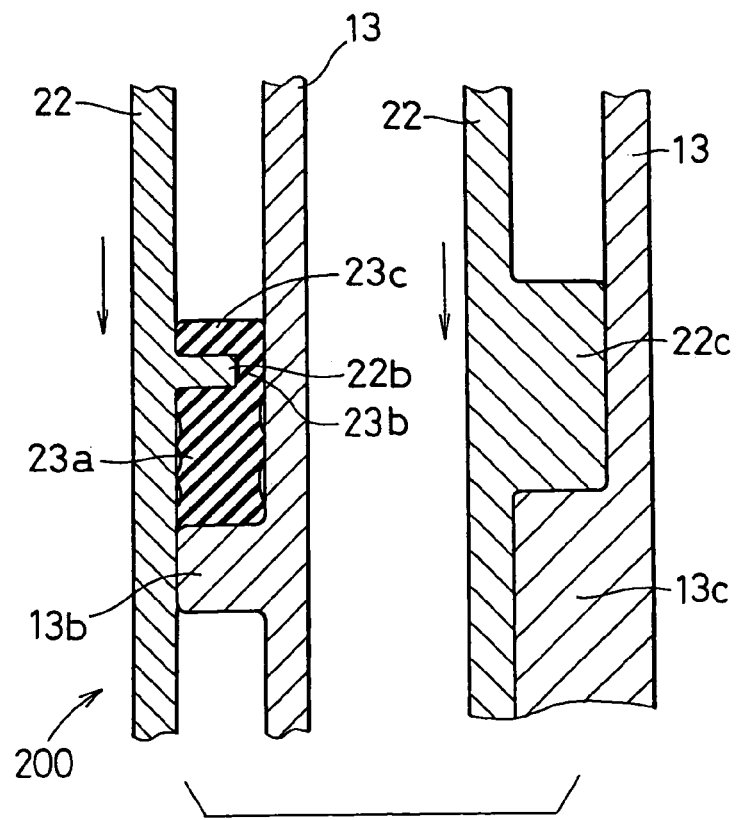

The gear-forming member 22 returns back to the state in FIG. 6A when the reactive force working on the gear-forming member 22 is released after the engine is started. Specifically, the gear-forming member 22 counter-rotates (upper side in FIG. 6B) from a condition shown in FIG. 6B to the condition shown in FIG. 6A, by elastic force of the cushion member 23 (i.e., the main-elastic section 23a). In this situation, an impact load does not arise due to the counter-rotation of the gear-forming member 22, while operation noise is decreased. Because each sub-elastic section 23c is located between each forcing wall 22b and each force-receiving walls 13b, so that the impact force can be absorbed.

Referring back to FIGS. 2A–2C, the fixed wall 13c contacts the movable wall 22, so that the rotating degree of the internal gear 8 is restricted, when excessive torque works on the internal gear 8 of the epicycle reduction gear 100. Here, the rotating degree of the internal gear 8 is equivalent to the compression rate of the main-elastic section 23a. Therefore, the main-elastic section 23a is not entirely compressed, and the cushion member 23 can be used in a predetermined compression rate (30% at maximum).

Here, the compression rate of the cushion member 23 is predetermined within 10–30% as described above. In general, allowable maximum compression rate of synthetic rubber is around 20%, in consideration of its durability. The cushion member 23 is used for a small period when the engine is started. Therefore, reliability of the cushion member 23 can be secured for a long period, even if the compression rate of the cushion member 23 exceeds 20%.

However, the cushion member may be damaged and broken, if the compression rate exceeds 30%, and this situation is not preferable. Therefore, the compression rate of the cushion member 23 is limited to be equal to or less than 30%, in the present invention. By contrast, excessive torque cannot be effectively absorbed when the compression rate of the cushion member 23 is less than 10%, when the movable wall 22c contacts the fixed wall 13c. Therefore, the lower limit of the compression rate is predetermined at 10%, so that elastic characteristic of the cushion member 23 can be effectively used. Thus, the cushion member 23 can be prevented from being breakage, damage and fatigue at an early state even if the cushion member 23 is repeatedly used for a long period. As a result, a reliability of the starter can be improved.

In this embodiment, the internal gear 8 is provided on one axial end side of the gear-forming member 22, and the forcing walls 22b are provided on the other axial end side. The cushion member 23 is received in the section between the forcing wall 22b of the gear-forming member 22 and the force-receiving walls 13b of the center case 13. That is, the cushion members 23 need not to be provided on the outer peripheral side of the internal gear 8. Accordingly, the outer diameter of the epicycle reduction gear 100 does not become large, so that a receiving space can be widely secured for the cushion member 23. As a result, a force receiving area of a cushion member 23 can be enlarged, so that this structure can be suitably applied to a high-power starter 1.

The fixed wall 13c, which restricts the rotating degree of the gear-forming member 22 (i.e., internal gear 8), is a stopper in the present invention. The fixed walls 13c are provided on the outer peripheral side with respect to the force-receiving walls 13b and the cushion members 23. In this case, the radius from the rotation center of the gear-forming member 22 to the fixed walls 13 becomes large, compared with a case in which the fixed walls 13c and the cushion members 23 are arranged on the substantially same circle. Therefore, a load working from the movable wall 22c on the fixed wall 13c can be reduced. Specifically, torque (moment) generated by the movable wall 22c becomes proportionally large as the radial distance from the rotation center to the movable wall 22c becomes large. Accordingly, the radial distance from the rotation center to the movable wall 22c is secured at a large distance, so that the torque can be secured, even if the load applied from the movable wall 22c to the fixed wall 13c is reduced. As a result, a large contacting area need not be secured between the fixed wall 13c and the movable wall 22c, so that the starter 1 can be downsized. Besides, the gap between the fixed wall 13c and the movable wall 22c can be adjusted, so that the compression rate of the cushion member 23 can be easily changed.

The cushion member 23 has the main-elastic section 23a and the sub-elastic section 23c. The forcing wall 22b of the gear-forming member 22 is press-inserted into the section between the main-elastic section 23a and the sub-elastic section 23c in the circumferential direction. Thus, the cushion member 23 can be positioned by the forcing wall 22b. As a result, the cushion member 23 is appropriately positioned and is not apt to be displaced, when the cushion member 23 is built on the gear-forming member 22. Besides, the cushion members 23 and the gear-forming member 22 can be easily attached to the center case 13. Besides, a circumferentially middle section of the main-elastic section 23a is pinched to be recessed from its end sections. Accordingly, the cross-sectional area of the main-elastic section 23a becomes small at the middle section. Therefore, deformation resistance of the middle section becomes small, when the main-elastic section 23a is compressed and deformed. Thus, the pinched middle section of the main-elastic section 23a radially expands so that the main-elastic section 23a can be easily deformed, when force works on the main-elastic section 23a. Besides, both circumferentially end sections of the cushion member 23 are not pinched, so that both the end sections can be steadily received in the space between each force-receiving wall 13b and each forcing wall 22b.

The force-receiving wall 13b and the forcing wall 22b are circumferentially arranged at constant intervals. Each cushion member 23 is received in the space between each force-receiving wall 13b and each forcing wall 22b. Accordingly, tilt and eccentric alignment of the gear-forming member 22 can be restricted with respect to the center case 13, in this structure. Therefore, the epicycle reduction gear 100 can be smoothly operated. Furthermore, excessive torque working on the internal gear 8 can be substantially uniformly received by the multiple cushion members 23, so that each cushion member 23 can be downsized.

Four of the cushion members 23 are circumferentially arranged at the constant intervals. The hemispherical protrusions 23d formed on each cushion member 23 (i.e., main-elastic section 23a) respectively contact each recessed container section 13d of the center case 13 and each recessed container section 22d of the gear-forming member 22 while being elastically received (inserted). In this case, the gear-forming member 22 can be positioned substantially in parallel with respect to the center case 13, by the multiple cushion members 23 uniformly arranged in the circumferential direction. As a result, the position of the internal gear 8 becomes stable, so that the planetary gear 9 engaging with the internal gear 8 is not inclined, so that eccentric load does not arise in the epicycle reduction gear 100. Therefore, the epicycle reduction gear 100 can be smoothly operated while reducing loss of driving torque.

Although the present invention has been fully described in connection with the preferred embodiment thereof with reference to the accompanying drawings, it is to be noted that various changes and modifications will become apparent to those skilled in the art.

For example, in the above-described embodiment, the rate between the peripheral length of the main-elastic section 23a and the peripheral length of the sub-elastic section 23c is set at 5:1. However, this rate is not necessarily limited to the rate (i.e., 5:1).

The number of the cushion members 23 is not necessarily four. When at least two of the cushion members 23 are arranged in a balanced manner (i.e., circumferentially arranged in a constant interval), the structure of the present invention can be effectively applied.

Such changes and modifications are to be understood as being within the scope of the present invention as defined by the appended claims.

What is claimed is:

1. A starter for transmitting a rotation force to an internal combustion engine, the starter comprising:
    a motor that generates the rotation force; and
    an epicycle reduction gear that reduces a rotation speed of the motor and transmits the rotation speed to the internal combustion engine, the epicycle reduction gear including:
    a sun gear that is rotated by the motor;
    an internal gear that is coaxially arranged with the sun gear;
    a rotation-restricting unit that includes a cushion member made of an elastic material, and restricts rotation of the internal gear via the cushion member; and
    a planetary gear that engages with the sun gear and the internal gear, wherein:
    when an excessive torque larger than a predetermined torque works on the internal gear, the cushion member is elastically compressed to permit a rotation of the internal gear; and
    the rotation-restricting unit further includes a stopper which restricts a rotating degree of the internal gear within a predetermined range when the excessive torque works on the internal gear.

2. The starter according to claim 1, wherein the rotation-restricting unit further includes:
    a fixed member that is fixed to be unable to circumferentially rotate, and is constructed with a force-receiving wall located circumferentially in a predetermined area and the stopper located on a radial outer side with respect to the force-receiving wall; and
    a cylindrical member that is circumferentially rotatable by a predetermined degree with respect to the fixed member;
    the cylindrical member includes the internal gear on one axially end side, a forcing wall arranged on the other axially end side with respect to the internal gear, and a movable wall arranged in a radial outer side with respect to the forcing wall;
    the movable wall is provided to be separated from the stopper by a predetermined circumferential distance;
    the cushion member is received between the force-receiving wall and the forcing wall while being compressed by a predetermined amount; and
    when the cylindrical member rotates by the predetermined degree with respect to the fixed member, the movable wall contacts the stopper so as to restrict a compression rate of the cushion member.

3. The starter according to claim 2, wherein the compression rate of the cushion member is set in a range between 10% and 30%.

4. The starter according to claim 2, wherein the cushion member has a circumferential middle section that is pinched compared with circumferential end sections of the cushion member.

5. The starter according to claim 2, wherein:
    the cushion member includes a main elastic section and a sub-elastic section integrally formed with the main elastic section; and
    the forcing wall is inserted between the main elastic section and the sub-elastic section in a circumferential direction.

6. The starter according to claim 5, wherein the cushion member further includes a bridging section for connecting the main-elastic section and the sub-elastic section.

7. The starter according to claim 5, wherein the force-receiving wall has a first wall part for elastically supporting the main elastic section with the forcing wall, and second wall part separated from the first wall part in the circumferential direction for elastically supporting the sub-elastic section with the forcing wall.

8. The starter according to claim 2, wherein:
    at least two pairs of the force-receiving walls and the forcing walls are circumferentially provided at a substantially constant interval; and
    each cushion member is received between each pair of the force-receiving wall and the forcing wall.

9. The starter according to claim 8, wherein:
    the cylindrical member has a surface that axially opposes a surface of the fixed member; and
    the cushion member contacts the surface of the cylindrical member and the surface of the fixed member to be inserted between both of the surface of the cylindrical member and the surface of the fixed member.

10. The starter according to claim 1, wherein the stopper is located at a position separated from the cushion member in a radial direction of the internal gear to restrict a compression degree of the cushion member within a predetermined range when the excessive torque works on the internal gear.

11. The starter according to claim 1,
    wherein the stopper includes a first member and a second member, which are circumferentially rotatable with respect to each other; and
    when the first member rotates by a predetermined rotating degree with respect to the second member, the first member makes contact with the second member to restrict a compression degree of the cushion member.

* * * * *